US012062830B2

(12) United States Patent
Li et al.

(10) Patent No.: US 12,062,830 B2
(45) Date of Patent: Aug. 13, 2024

(54) ANTENNA ASSEMBLY AND COMMUNICATION DEVICE WITH LIGHTING FUNCTION

(71) Applicant: HTC Corporation, Taoyuan (TW)

(72) Inventors: Kang Ling Li, Taoyuan (TW); Chia Te Chien, Taoyuan (TW); Cheng Hung Lin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 186 days.

(21) Appl. No.: 17/976,624

(22) Filed: Oct. 28, 2022

(65) Prior Publication Data

US 2023/0282957 A1 Sep. 7, 2023

Related U.S. Application Data

(60) Provisional application No. 63/317,086, filed on Mar. 7, 2022.

(51) Int. Cl.

| | |
|---|---|
| ***H01Q 1/06*** | (2006.01) |
| ***F21S 8/04*** | (2006.01) |
| ***H01Q 13/08*** | (2006.01) |
| ***H01Q 21/30*** | (2006.01) |
| *F21Y 115/10* | (2016.01) |

(52) U.S. Cl.

CPC .................. *H01Q 1/06* (2013.01); *F21S 8/04* (2013.01); *H01Q 13/085* (2013.01); *H01Q 21/30* (2013.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| 6,518,931 | B1 * | 2/2003 | Sievenpiper | H01Q 15/008 343/770 |
| 2015/0222019 | A1 * | 8/2015 | Robson | H01Q 3/01 343/904 |
| 2018/0069322 | A1 * | 3/2018 | Vouvakis | H01Q 21/064 |
| 2018/0159235 | A1 * | 6/2018 | Wolniansky | H01Q 1/48 |
| 2018/0159238 | A1 * | 6/2018 | Wolniansky | H01Q 13/085 |

* cited by examiner

*Primary Examiner* — Wilson Lee

(74) *Attorney, Agent, or Firm* — Birch, Stewart, Kolasch & Birch, LLP

(57) ABSTRACT

An antenna assembly with a lighting function includes a Vivaldi antenna, a plurality of first LEDs (Light Emitting Diodes), and a plurality of second LEDs. The Vivaldi antenna includes a first radiation element and a second radiation element. A notch region is defined by the first radiation element and the second radiation element. The first LEDs are disposed inside the notch region. The first LEDs are used as matching elements of the Vivaldi antenna. The second LEDs are disposed outside the notch region. The second LEDs are used as directors of the Vivaldi antenna.

20 Claims, 8 Drawing Sheets

ANTENNA ASSEMBLY AND COMMUNICATION DEVICE WITH LIGHTING FUNCTION

CROSS REFERENCE TO RELATED APPLICATIONS

This application claims the benefit of U.S. Provisional Application No. 63/317,086, filed on Mar. 7, 2022, the entirety of which is incorporated by reference herein.

BACKGROUND OF THE INVENTION

Field of the Invention

The invention relates to an antenna assembly, and more particularly, to an antenna assembly supporting wideband operations.

Description of the Related Art

With the advances being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Wireless access points are indispensable elements for mobile devices in a room to connect to the Internet at a high speed. However, since the indoor environment has serious signal reflection and multipath fading, a wireless access point should process signals from a variety of transmission directions simultaneously. Accordingly, it has become a critical challenge for current designers to design a wideband and omnidirectional antenna assembly in the limited space of a wireless access point.

BRIEF SUMMARY OF THE INVENTION

In a preferred embodiment, the invention proposes an antenna assembly with a lighting function. The antenna assembly includes a Vivaldi antenna, a plurality of first LEDs (Light Emitting Diodes), and a plurality of second LEDs. The Vivaldi antenna includes a first radiation element and a second radiation element. A notch region is defined by the first radiation element and the second radiation element. The first LEDs are disposed inside the notch region. The first LEDs are used as matching elements of the Vivaldi antenna. The second LEDs are disposed outside the notch region. The second LEDs are used as directors of the Vivaldi antenna.

In some embodiments, the antenna assembly further includes a dielectric substrate. The dielectric substrate has a first surface and a second surface which are opposite to each other. The first radiation element is disposed on the first surface of the dielectric substrate. The second radiation element is disposed on the second surface of the dielectric substrate.

In some embodiments, the first LEDs and the second LEDs are all disposed on the first surface of the dielectric substrate.

In some embodiments, the notch region substantially has a tapered shape.

In some embodiments, the antenna assembly covers an operational frequency band from 600 MHz to 7125 MHz.

In some embodiments, the distance between the notch region and each of the second LEDs is shorter than or equal to 1 wavelength of the operational frequency band.

In another preferred embodiment, the invention proposes a communication device with a lighting function. The communication device includes a plurality of antenna assemblies, a feeding network, and a plurality of RF (Radio Frequency) switches. Each of the antenna assemblies includes a Vivaldi antenna, a plurality of first LEDs, and a plurality of second LEDs. The Vivaldi antenna includes a first radiation element and a second radiation element. A notch region is defined by the first radiation element and the second radiation element. The first LEDs are disposed inside the notch region. The first LEDs are used as matching elements of the Vivaldi antenna. The second LEDs are disposed outside the notch region. The second LEDs are used as directors of the Vivaldi antenna. The feeding network is coupled to the antenna assemblies. The RF switches are disposed in the feeding network. A portion or all of the antenna assemblies are selectively enabled or disabled by using the RF switches.

In some embodiments, the communication device further includes a multilayer circuit board. The feeding network and the RF switches are integrated with the multilayer circuit board.

In some embodiments, the communication device provides an almost omnidirectional radiation pattern.

In some embodiments, a petal-type antenna array is formed by the antenna assemblies.

In some embodiments, the communication device operates in a first mode, a second mode, or a third mode.

In some embodiments, in the first mode, the antenna assemblies are all enabled.

In some embodiments, in the second mode, only one of the antenna assemblies is enabled.

In some embodiments, in the third mode, the antenna assemblies are partially enabled.

In some embodiments, the communication device is implemented with a ceiling lamp.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
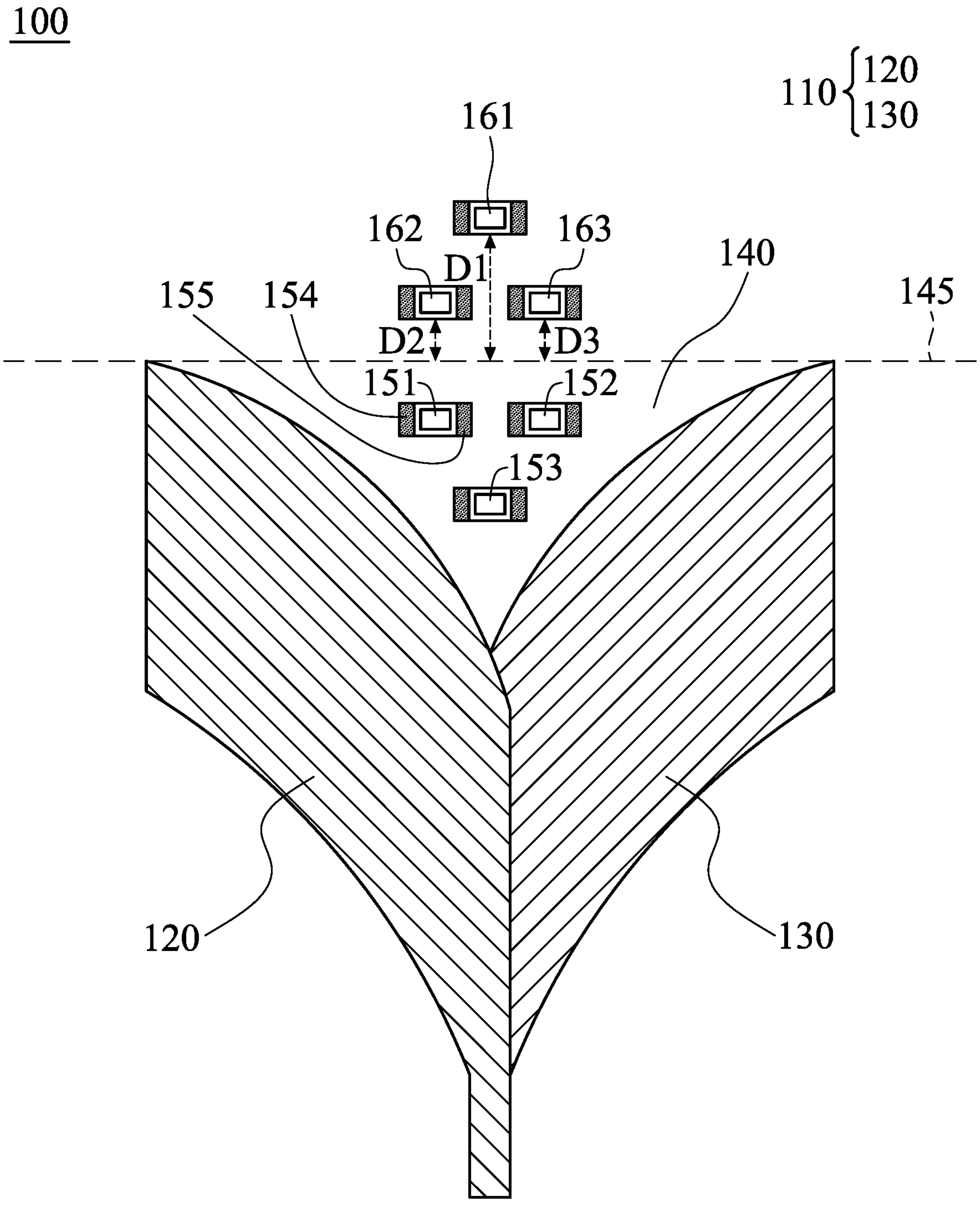
FIG. 1 is a top view of an antenna assembly according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna assembly 100 according to an embodiment of the invention. The antenna assembly 100 may be applied in a communication device, such as a wireless access point, but it is not limited thereto. In the embodiment of FIG. 1, the antenna assembly 100 includes a Vivaldi antenna 110, a plurality of first LEDs (Light Emitting Diodes) 151, 152 and 153, and a plurality of second LEDs 161, 162 and 163. It should be understood that the antenna assembly 100 may further include other components, such as a housing, a processor, and/or a power supply module, although they are not displayed in FIG. 1.

The Vivaldi antenna 110 includes a first radiation element 120 and a second radiation element 130. The first radiation element 120 and the second radiation element 130 may be made of metal materials. For example, the first radiation element 120 and the second radiation element 130 may be disposed on the same or different planes. A notch region 140 is defined by the first radiation element 120 and the second radiation element 130. In some embodiments, the notch region 140 substantially has a tapered shape, which may be substantially positioned between the first radiation element 120 and the second radiation element 130. In addition, the notch region 140 may have an edge line 145, which may be considered as a virtual boundary of the notch region 140. In alternative embodiments, the notch region 140 may substantially have an inverted triangular shape.

In some embodiments, the antenna assembly 100 can cover an operational frequency band from 600 MHz to 7125 MHz. Therefore, the antenna assembly 100 can support at least the wideband operations of next 5G (5th Generation Wireless System) and Wi-Fi 6E. However, the invention is not limited thereto. In alternative embodiments, the antenna assembly 100 can also cover the wideband operations of mmWave (Millimeter Wave).

The first LEDs 151, 152 and 153 are disposed inside the notch region 140. In other words, the first LEDs 151, 152 and 153 are all inside the internal space surrounded by the first radiation element 120, the second radiation element 130, and the edge line 145 of the notch region 140. The first LEDs 151, 152 and 153 are used as matching elements of the Vivaldi antenna 110. That is, because the first LEDs 151, 152 and 153 are relatively adjacent to the Vivaldi antenna 110, the first LEDs 151, 152 and 153 are configured to fine-tune the impedance matching of the Vivaldi antenna 110. It should be understood that the total number of aforementioned first LEDs is not limited in the invention. In alternative embodiments, the antenna assembly 100 includes more or fewer first LEDs according to different requirements.

The second LEDs 161, 162 and 163 are disposed outside the notch region 140. In other words, the second LEDs 161, 162 and 163 are all inside the external space above the edge line 145 of the notch region 140. The second LEDs 161, 162 and 163 are used as directors of the Vivaldi antenna 110. That is, because the second LEDs 161, 162 and 163 are relatively away from the Vivaldi antenna 110, the second LEDs 161, 162 and 163 are configured to guide and enhance the electromagnetic waves from the Vivaldi antenna 110. It should be understood that the total number of aforementioned second LEDs is not limited in the invention. In alternative embodiments, the antenna assembly 100 includes more or fewer second LEDs according to different requirements.

In some embodiments, the distance between the notch region 140 (or its edge line 145) and each of the second LEDs 161, 162 and 163 is shorter than or equal to 1 wavelength (1λ) of the operational frequency band of the antenna assembly 100. Specifically, the distance D1 between the second LED 161 and the edge line 145, the distance D2 between the second LED 162 and the edge line 145, and the distance D3 between the second LED 163 and the edge line 145 may all be shorter than or equal to 1 wavelength (1λ) of the operational frequency band of the antenna assembly 100. The above distance ranges can help optimize the directing functions of the second LEDs 161, 162 and 163.

According to practical measurements, the incorporation of the first LEDs 151, 152 and 153 can increase the operational bandwidth of the Vivaldi antenna 110, and the incorporation of the second LEDs 161, 162 and 163 can enhance the radiation gain of the Vivaldi antenna 110. The design of the invention not only gives the proposed antenna assembly 100 a lighting function, but it also provides good communication quality.

In some embodiments, the antenna assembly 100 further includes a plurality of metal pin pads. For example, the first LED 151 is coupled between a first metal pin pad 154 and a second metal pin pad 155, so as to form a current path. In addition, each of the other LEDs may be arranged in a similar way. It should be noted that the aforementioned metal pin pads are merely optional elements, which are omitted in other embodiments.

The following embodiments will introduce different configurations and applications of the antenna assembly 100. It should be understood that these figures and descriptions are merely exemplary, rather than limitations of the invention.

Figure 2:
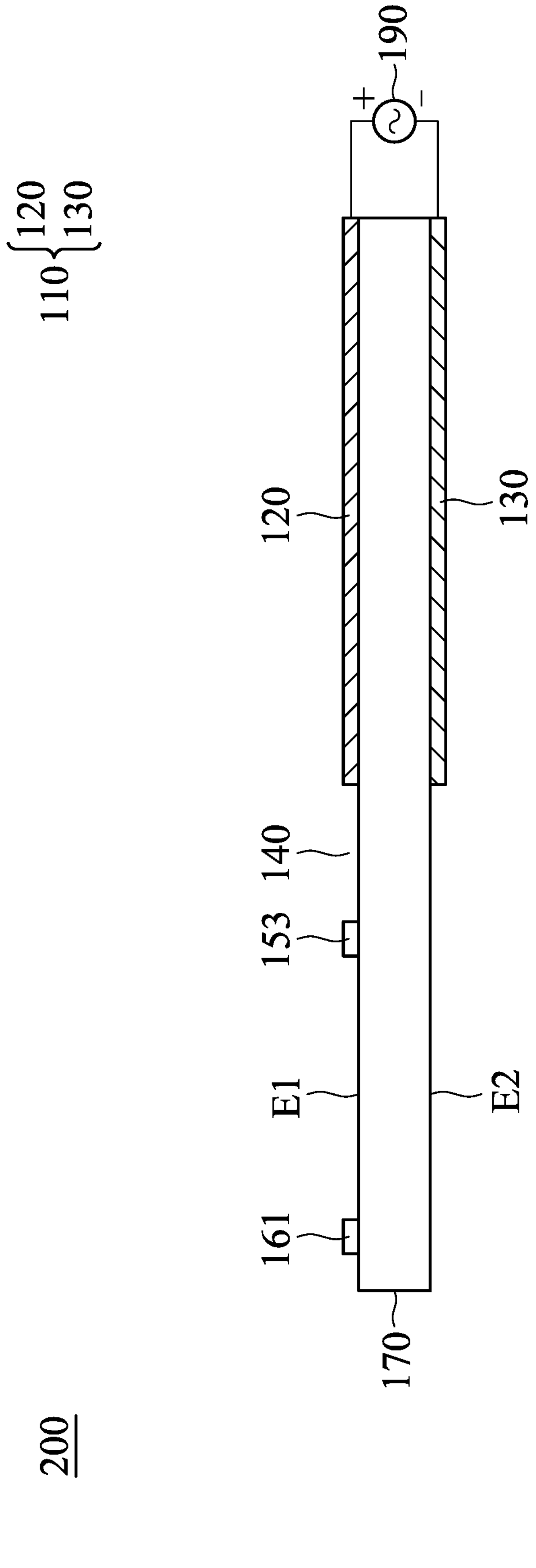
FIG. 2 is a sectional view of an antenna assembly according to another embodiment of the invention.

FIG. 2 is a sectional view of an antenna assembly 200 according to another embodiment of the invention. FIG. 2 is similar to FIG. 1. In the embodiment of FIG. 2, the antenna assembly 200 further includes a dielectric substrate 170 and a signal source 190. For example, the dielectric substrate 170 may be an FR4 (Flame Retardant 4) substrate, a PCB (Printed Circuit Board), or an FPC (Flexible Printed Circuit). The dielectric substrate 170 has a first surface E1 and a second surface E2 which are opposite to each other. The first radiation element 120 is disposed on the first surface E1 of the dielectric substrate 170. The second radiation element 130 is disposed on the second surface E2 of the dielectric substrate 170. In addition, the first LEDs 151, 152 and 153 and the second LEDs 161, 162 and 163 may all be disposed on the first surface E1 of the dielectric substrate 170. The signal source 190 may be an RF (Radio Frequency) module. For example, the signal source 190 may have a positive electrode and a negative electrode. The positive electrode of the signal source 190 may be coupled to the first radiation element 120, and the negative electrode of the signal source 190 may be coupled to the second radiation element 130, but they are not limited thereto. Other features of the antenna assembly 200 of FIG. 2 are similar to those of the antenna assembly 100 of FIG. 1. Therefore, the two embodiments can achieve similar levels of performance.

Figure 3:
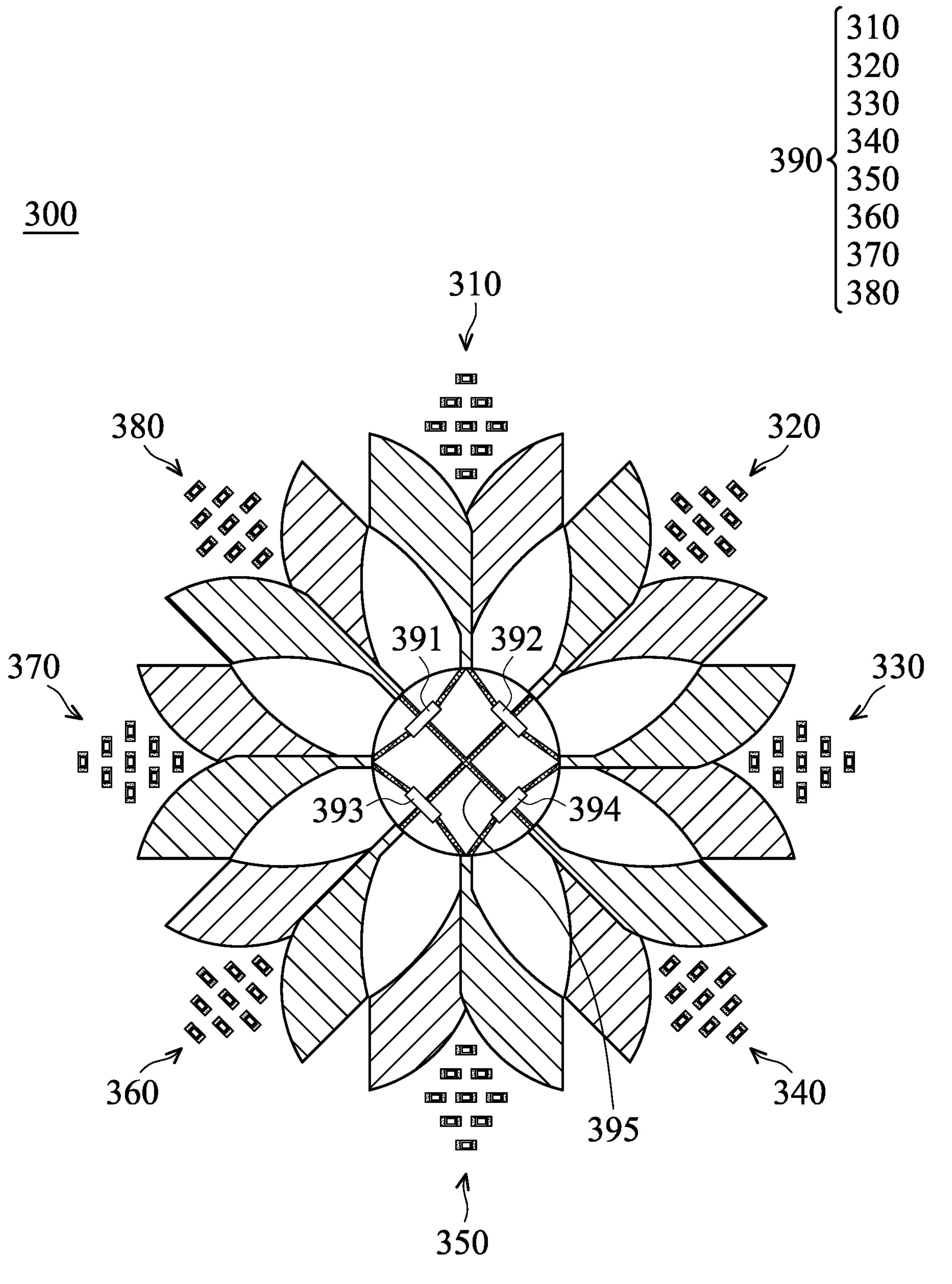
FIG. 3 is a top view of a communication device according to an embodiment of the invention.

FIG. 3 is a top view of a communication device 300 according to an embodiment of the invention. In the embodiment of FIG. 3, the communication device 300 includes a plurality of antenna assemblies 310, 320, 330, 340, 350, 360, 370 and 380, a plurality of RF switches 391, 392, 393 and 394, and a feeding network 395.

The antenna assemblies 310, 320, 330, 340, 350, 360, 370 and 380 are arranged so that they face different directions. For example, a petal-type antenna array 390 may be formed by the antenna assemblies 310, 320, 330, 340, 350, 360, 370 and 380. Because it is designed this way, the communication device 300 can provide an almost omnidirectional radiation pattern. According to practical measurements, interference between antenna assemblies 310, 320, 330, 340, 350, 360, 370 and 380 can be minimized. The internal structure of each of the antenna assemblies 310, 320, 330, 340, 350, 360, 370 and 380 has been described in the embodiment of FIG. 1, and it will not be described again herein. It should be understood that the total number of aforementioned antenna assemblies is not limited in the invention. In alternative embodiments, the communication device 300 includes more or fewer antenna assemblies according to different requirements.

The feeding network 395 is coupled to the antenna assemblies 310, 320, 330, 340, 350, 360, 370 and 380. In some embodiments, the central point of the feeding network 395 is further coupled to a signal source (not shown), so as to excite the antenna assemblies 310, 320, 330, 340, 350, 360, 370 and 380. The RF switches 391, 392, 393 and 394 are all disposed in the feeding network 395. By using the RF switches 391, 392, 393 and 394, a portion or all of the antenna assemblies 310, 320, 330, 340, 350, 360, 370 and 380 can be selectively enabled or disabled. It should be understood that the total number of aforementioned RF switches is not limited in the invention. In alternative embodiments, the communication device 300 includes more or fewer RF switches according to different requirements.

Figure 4:
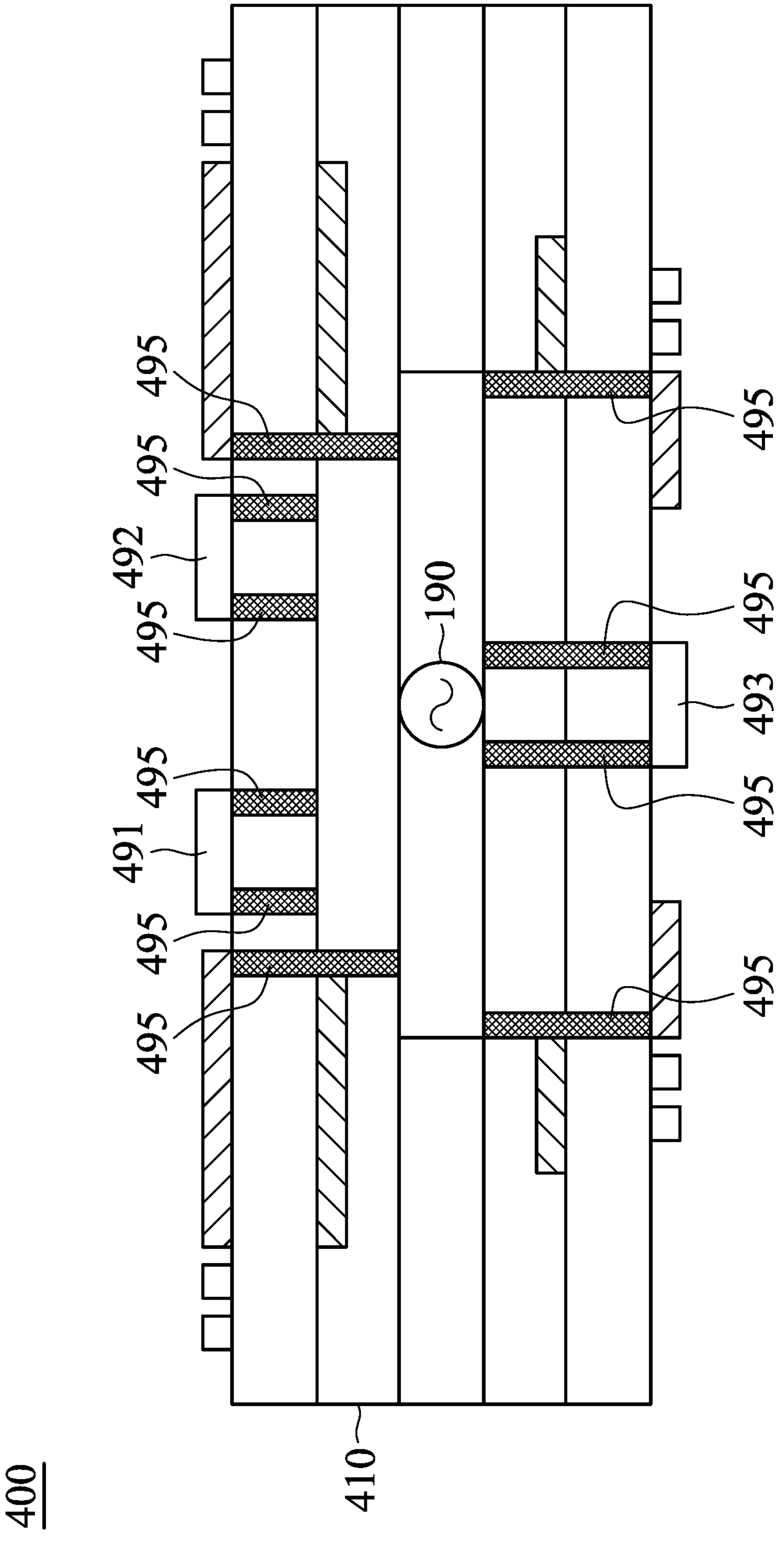
FIG. 4 is a sectional view of a communication device according to another embodiment of the invention.

FIG. 4 is a sectional view of a communication device 400 according to another embodiment of the invention. In the embodiment of FIG. 4, the communication device 400 includes a multilayer circuit board 410, a plurality of RF switches 491, 492 and 493, and a feeding network 495. As shown in FIG. 4, the feeding network 495 and the RF switches 491, 492 and 493 are integrated with the multilayer circuit board 410, such that the whole size of the communication device 400 can be further reduced. Furthermore, the aforementioned antenna assemblies may be disposed on different surfaces of the multilayer circuit board 410, so as to increase the whole design freedom. It should be understood that the arrangements of the feeding network 495 and the RF switches 491, 492 and 493 are merely exemplary, and they may be appropriately adjusted in other embodiments.

Please refer to FIG. 3 again. In some embodiments, the communication device 300 operates in a first mode, a second mode, or a third mode, and they will be respectively described as follows.

Figure 5A:
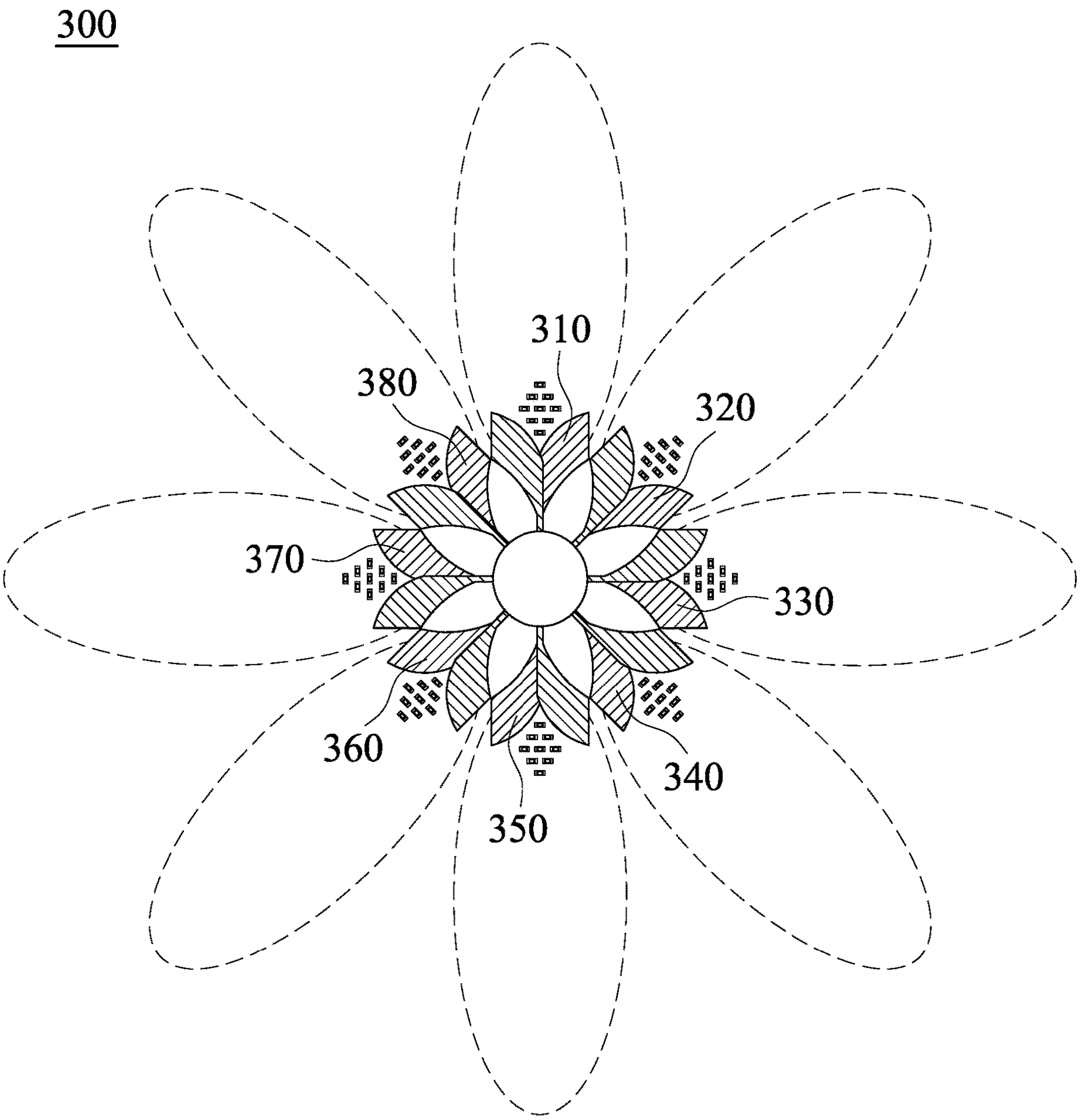
FIG. 5A is a radiation pattern of a communication device operating in a first mode according to an embodiment of the invention.

FIG. 5A is a radiation pattern of the communication device 300 operating in the first mode according to an embodiment of the invention. According to the measurement of FIG. 5A, in the aforementioned first mode, all of the antenna assemblies 310, 320, 330, 340, 350, 360, 370 and 380 are enabled. Therefore, the communication device 300 can provide an almost omnidirectional radiation pattern.

Figure 5B:
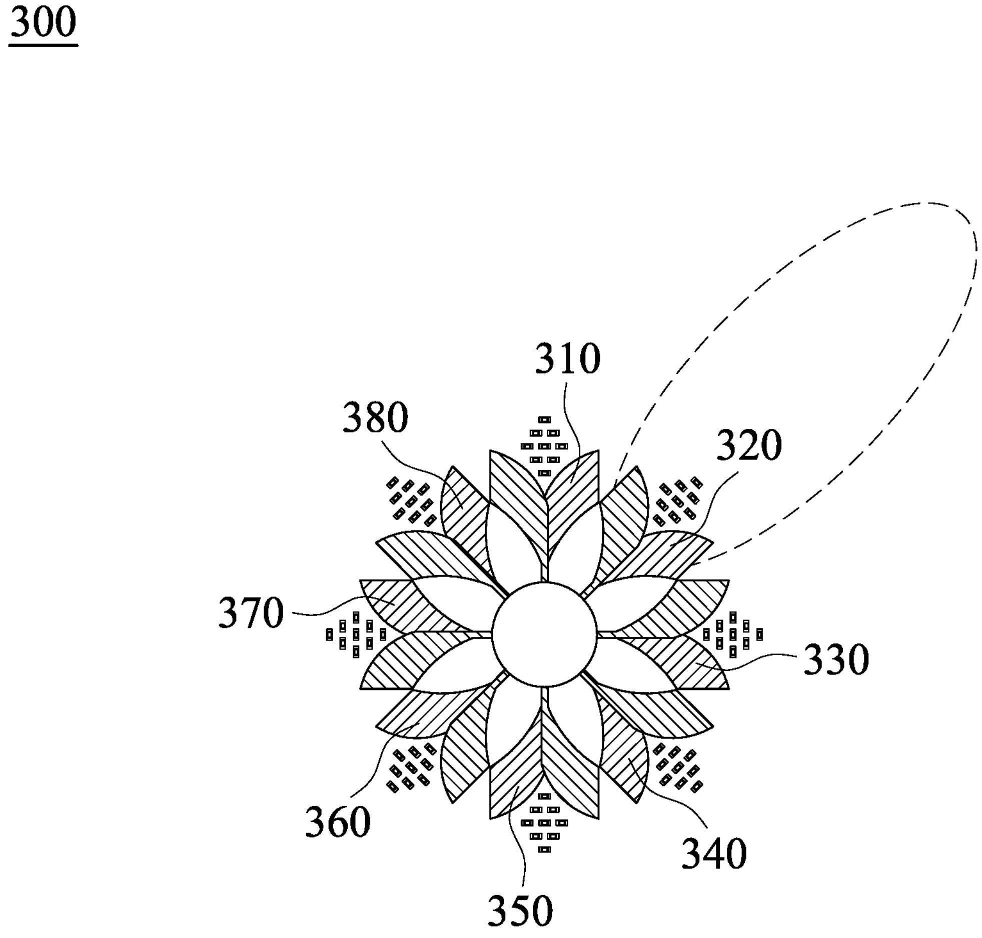
FIG. 5B is a radiation pattern of a communication device operating in a second mode according to an embodiment of the invention.

FIG. 5B is a radiation pattern of the communication device 300 operating in the second mode according to an embodiment of the invention. According to the measurement of FIG. 5B, in the aforementioned second mode, only one of the antenna assemblies 310, 320, 330, 340, 350, 360, 370 and 380 is enabled, and the other antenna assemblies are disabled. Therefore, the communication device 300 can provide a radiation pattern with high directivity.

Figure 5C:
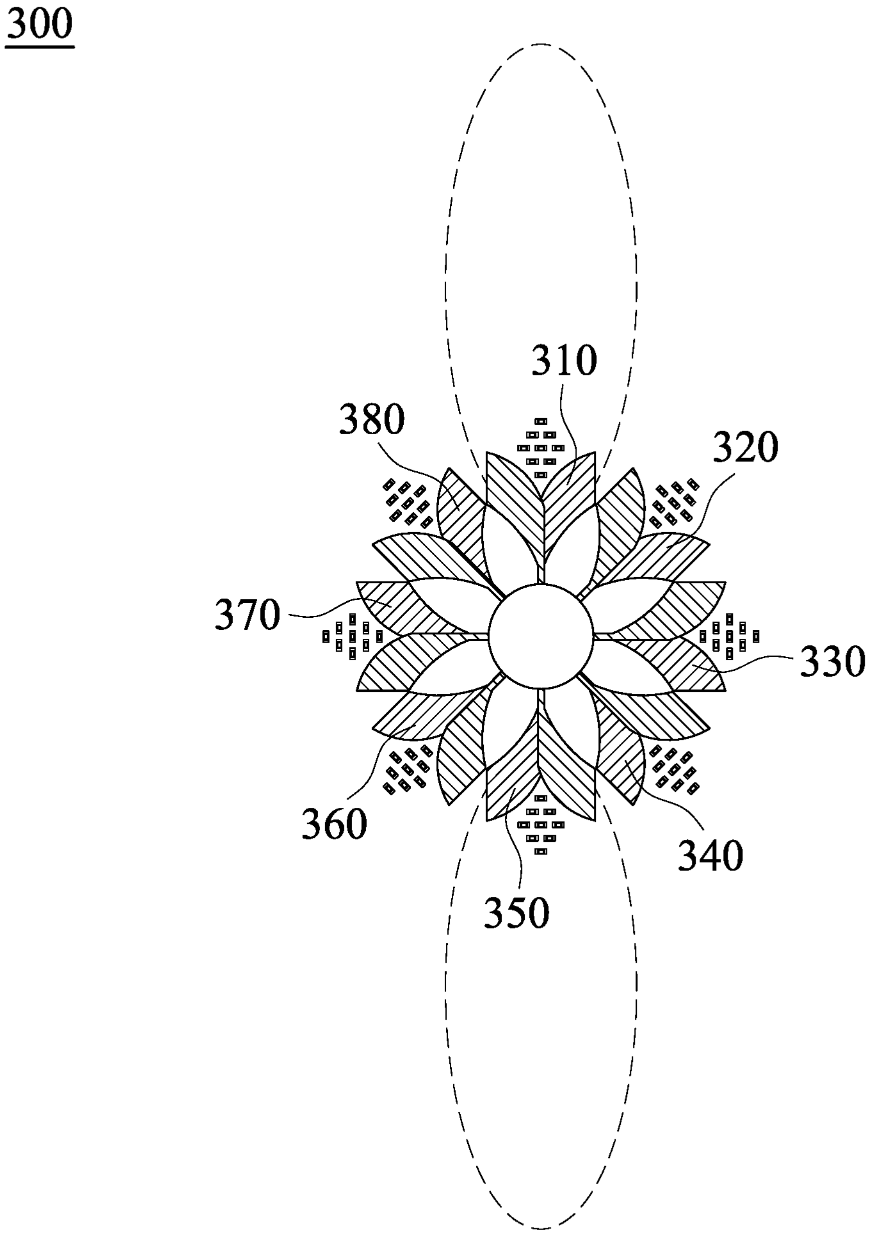
FIG. 5C is a radiation pattern of a communication device operating in a third mode according to an embodiment of the invention.

FIG. 5C is a radiation pattern of the communication device 300 operating in the third mode according to an embodiment of the invention. According to the measurement of FIG. 5C, in the aforementioned third mode, the antenna assemblies 310, 320, 330, 340, 350, 360, 370 and 380 are partially enabled, and the other antenna assemblies are disabled. Therefore, the communication device 300 can provide a variety of radiation patterns according to different requirements.

Figure 6:
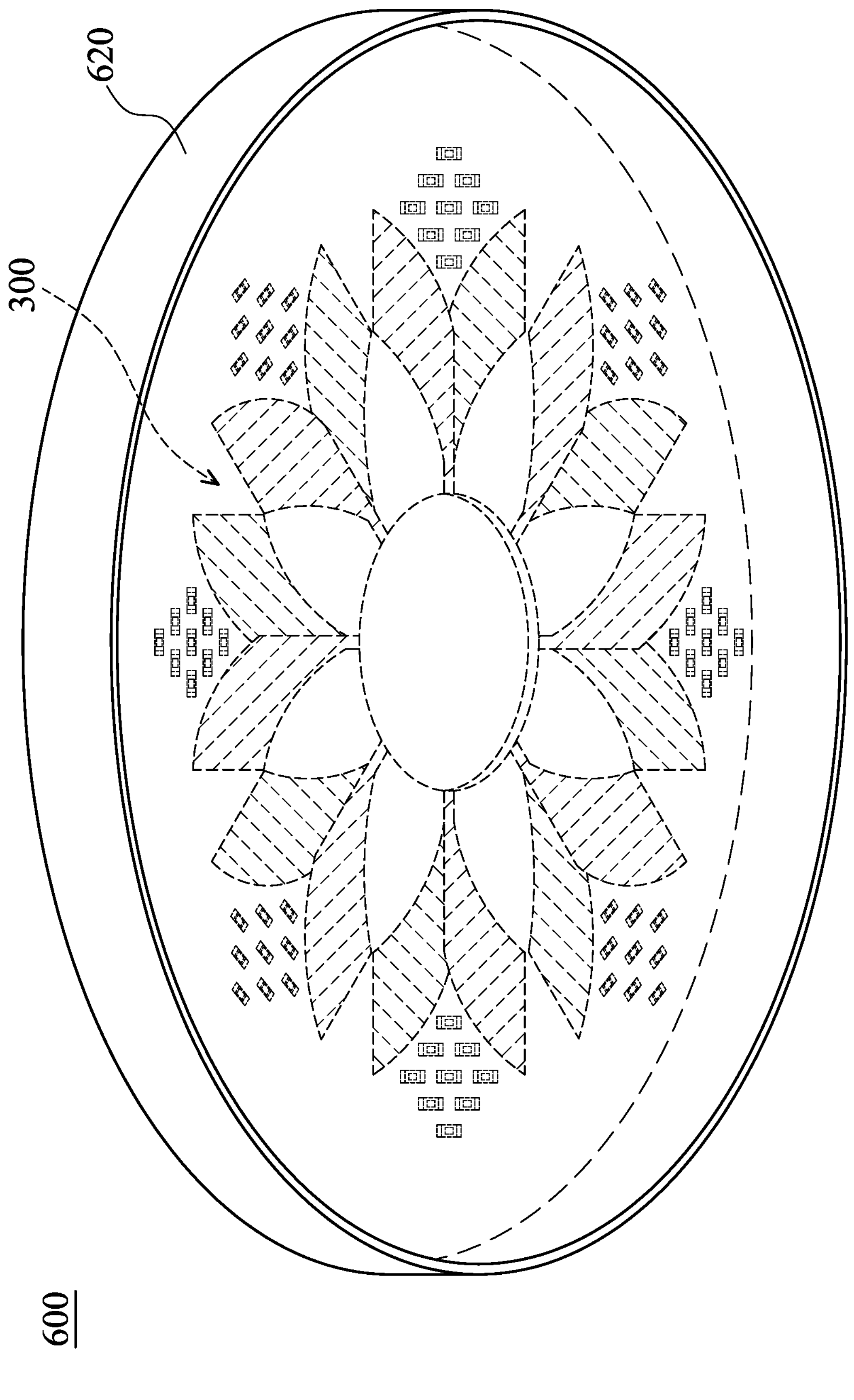
FIG. 6 is a perspective view of a ceiling lamp according to an embodiment of the invention.

FIG. 6 is a perspective view of a ceiling lamp 600 according to an embodiment of the invention. In the embodiment of FIG. 6, the aforementioned communication device 300 is implemented with the ceiling lamp 600. The ceiling lamp 600 further includes a nonconductive lampshade 620 for covering the aforementioned communication device 300. It should be noted that the nonconductive lampshade 620 can pass light of all LEDs, but does not block the electromagnetic waves from the communication device 300. Using this design, a ceiling lamp 600 can be used as a wireless access point in a smart home, and it can provide the necessary function of wireless communication between units of IOT (Internet of Things). Furthermore, the ceiling lamp 600 including the communication device 300 can also be configured as an indoor decorative element. Other features of the ceiling lamp 600 of FIG. 6 are similar to those of the communication device 300 of FIG. 3. Therefore, the two embodiments can achieve similar levels of performance.

The invention proposed a novel antenna assembly and a novel communication device. In comparison to the conventional design, the invention has at least the advantages of providing the function of lighting, increasing the operational bandwidth, generating a high-gain or omnidirectional radiation pattern, and improving the device appearance. Therefore, the invention is suitable for applications in a variety of devices.

Note that the above element parameters are not limitations of the invention. A designer can fine-tune these setting values according to different requirements. It should be understood that the antenna assembly and communication device of the invention are not limited to the configurations of FIGS. 1-6. The invention may include any one or more features of any one or more embodiments of FIGS. 1-6. In other words, not all of the features displayed in the figures should be implemented in the antenna assembly and communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An antenna assembly with a lighting function, comprising:

- a Vivaldi antenna, comprising a first radiation element and a second radiation element; wherein a notch region is defined by the first radiation element and the second radiation element;
- a plurality of first LEDs (Light Emitting Diodes), disposed inside the notch region; wherein the first LEDs are used as matching elements of the Vivaldi antenna; and
- a plurality of second LEDs, disposed outside the notch region; wherein the second LEDs are used as directors of the Vivaldi antenna.

2. The antenna assembly as claimed in claim 1, further comprising:

- a dielectric substrate, having a first surface and a second surface opposite to each other; wherein the first radiation element is disposed on the first surface of the dielectric substrate, and the second radiation element is disposed on the second surface of the dielectric substrate.

3. The antenna assembly as claimed in claim 2, wherein the first LEDs and the second LEDs are disposed on the first surface of the dielectric substrate.

4. The antenna assembly as claimed in claim 1, wherein the notch region substantially has a tapered shape.

5. The antenna assembly as claimed in claim 1, wherein the antenna assembly covers an operational frequency band from 600 MHz to 7125 MHz.

6. The antenna assembly as claimed in claim 5, wherein a distance between the notch region and each of the second LEDs is shorter than or equal to 1 wavelength of the operational frequency band.

7. A communication device with a lighting function, comprising:

- a plurality of antenna assemblies; wherein each of the antenna assemblies comprises:
  - a Vivaldi antenna, comprising a first radiation element and a second radiation element; wherein a notch region is defined by the first radiation element and the second radiation element;
  - a plurality of first LEDs, disposed inside the notch region; wherein the first LEDs are used as matching elements of the Vivaldi antenna; and
  - a plurality of second LEDs, disposed outside the notch region; wherein the second LEDs are used as directors of the Vivaldi antenna;
- a feeding network, coupled to the antenna assemblies; and
- a plurality of RF (Radio Frequency) switches, disposed in the feeding network; wherein a portion or all of the antenna assemblies are selectively enabled or disabled by using the RF switches.

8. The communication device as claimed in claim 7, wherein each of the antenna assemblies further comprises:

- a dielectric substrate, having a first surface and a second surface opposite to each other; wherein the first radiation element is disposed on the first surface of the dielectric substrate, and the second radiation element is disposed on the second surface of the dielectric substrate.

9. The communication device as claimed in claim 8, wherein the first LEDs and the second LEDs are disposed on the first surface of the dielectric substrate.

10. The communication device as claimed in claim 7, wherein the notch region substantially has a tapered shape.

11. The communication device as claimed in claim 7, wherein the antenna assemblies cover an operational frequency band from 600 MHz to 7125 MHz.

12. The communication device as claimed in claim 11, wherein a distance between the notch region and each of the second LEDs is shorter than or equal to 1 wavelength of the operational frequency band.

13. The communication device as claimed in claim 7, further comprising:

- a multilayer circuit board; wherein the feeding network and the RF switches are integrated with the multilayer circuit board.

14. The communication device as claimed in claim 7, wherein the communication device provides an almost omnidirectional radiation pattern.

15. The communication device as claimed in claim 7, wherein a petal-type antenna array is formed by the antenna assemblies.

16. The communication device as claimed in claim 7, wherein the communication device operates in a first mode, a second mode, or a third mode.

17. The communication device as claimed in claim 16, wherein in the first mode, the antenna assemblies are all enabled.

18. The communication device as claimed in claim 16, wherein in the second mode, only one of the antenna assemblies is enabled.

19. The communication device as claimed in claim 16, wherein in the third mode, the antenna assemblies are partially enabled.

20. The communication device as claimed in claim 7, wherein the communication device is implemented with a ceiling lamp.

* * * * *